May 23, 1961 G. SWIFT 2,985,829
METHOD AND APPARATUS FOR DETERMINING DRILL BIT SPEED
Filed Sept. 30, 1957 4 Sheets-Sheet 1

INVENTOR.
Gilbert Swift
BY James B. Hambrell
AGENT

INVENTOR.
Gilbert Swift

May 23, 1961 G. SWIFT 2,985,829
METHOD AND APPARATUS FOR DETERMINING DRILL BIT SPEED
Filed Sept. 30, 1957 4 Sheets-Sheet 4

INVENTOR.
Gilbert Swift
BY James B. Gambrell
AGENT

United States Patent Office 2,985,829
Patented May 23, 1961

2,985,829

METHOD AND APPARATUS FOR DETERMINING DRILL BIT SPEED

Gilbert Swift, Tulsa, Okla., assignor to Well Surveys, Inc., a corporation of Delaware Filed Sept. 30, 1957, Ser. No. 686,990

6 Claims. (Cl. 324—70)

This invention relates to a system for determining the speed of a drill bit and more particularly to a system wherein the power unit is located at the bottom of the hole.

Conventional drilling techniques which employ rotary type drills have never presented a problem insofar as the determination of the rotating speed of the drill is concerned. Because the drill pipe rotates with the drill bit, a simple arrangement including a tachometer or some such similar device may be used in conjunction with the drill pipe or kelly and at a position convenient to the surface of the ground or drill rig.

However, recent improvements in turbodrills have made them potential economic competitors of the more conventional drilling apparatus and, as a result, it is necessary to determine drill speed by some means other than attaching a speed indicating device to the drill pipe. These improved versions of so-called mud turbines, which show promise of overcoming long-standing deficiencies in such devices, are described in various articles, see, e.g., "What's Happening to Turbodrill Development?" by W. R. Postlewaite, 141 World Oil 156 (October 1955) and "Turbodrills for American Drilling" by John B. O'Connor, 1 Monitor 2 (November 1956). Reference to the intricate details of construction of turbodrills is not necessary since the need for the present invention depends not upon the detailed structure of the drill but rather upon the general fact that a mud impellant is pumped to the turbine, which is suspended at the remote or subsurface end of the drill pipe, for the purpose of rotating the drill bit. That is to say, the rotating means do not extend to the surface of the ground and, hence, the drill pipe rate of rotation does not necessarily correspond to the rotation rate of the drill bit.

Since the drill pipe no longer positively drives the drill bit in this type of drilling technique, conventional surface instrumentation will not provide an accurate indication of drill bit speed. Of course, one possibility would be to secure some type of speedometer or tachometer to the end of the drill pipe adjacent the turbine, to the turbine rotors or to the drill bit and thereafter precisely measure the actual speed of rotation. Such an arrangement would not prove feasible however, since it would require a plurality of input and output leads threaded through the drill pipe or, what would be even more complex, outside of the drill pipe with the attendant complications, both technical and economic. The discontinuity of the jointed drill pipe which raises the problem of bridging the electrical connections from one section to the other, inter alia, would militate against the use of such a subsurface detecting device.

A few attempts have been made to overcome these obvious difficulties, but so far none have proved entirely successful. One method suggested utilizes an acoustic signal generator adjacent the turbine. The frequency of the generated signal corresponds to the turbine speed and surface instrumentation is to be provided to detect this signal after it reaches the surface through the geological formations. The degree of success likely to accompany this and other similar efforts would appear none too great since the formations in many cases so effectively absorb vibrations that geophones and the like cannot detect them. Then too, the necessary components for the signal generator present technical and cost problems which may be extreme.

It is with these difficulties in mind that the present invention was conceived. Advantage is taken of the fact that as a turbodrill rotates, due to imperfections in turbine and drill bit construction and the nonhomogeneity of the subsurface formations, certain vibratory patterns are formed, which patterns repeat at a rate correlatable with the speed of the turbine and drill bit. These vibrations are caused by impact of the drill bit as it bores into the formation and passage of the mud impellant through the imperfectly formed turbine blades. These vibrations, along with many vibrations which do not correlate with the turbine or drill bit speed, are transmitted through the mud stream, the drill pipe and the subsurface formations until they are attenuated and ultimately overcome by minimum levels of noise. These vibrations may be detected provided the path is not too great since the drill pipe provides a relatively efficient path for the transmission of vibrations created by the rotation of the drill bit.

The present invention utilizes transducing means associated with the upper portion of the overall drill pipe assembly to detect vibrations from whatever source they originate. The vibrations converted to electrical signals are thereafter defined, identified and, in some cases, eliminated to ultimately provide a signal corresponding to the rotation rate of the turbine rotor and drill bit.

As noted above, all of the vibrations picked up by the detecting device will not be correlated solely with the rate of rotation of the rotor and drill bit, since there will also exist a multiplicity of random noises and vibrations as well as certain repetitive patterns caused by other phenomena. The latter, for example, may include those caused by the slow backward or forward rotation of the drill pipe (to prevent sticking) and/or the operation of the mud pump. These other or known regular vibratory patterns along with random vibrations are eliminated in order to leave primarily those patterns which may be used to obtain a true indication of turbine or drill bit speed.

It is therefore a major object of the present invention to determine the drill bit speed of a turbo-type drill by the principal use of surface instrumentation. More particularly, it is an object of the invention to provide a method and technique for obtaining actual turbodrill speed economically and rapidly without requiring expensive subsurface components or instruments.

A feature of the invention relates to the combination of means for detecting the entire vibratory spectrum created by the operation of bore-hole equipment and means to eliminate unwanted random and known repetitious vibratory patterns in order to place in bold relief those regularly repeating vibrations which correlate with the speed of the drill bit.

More particularly, a feature of the invention pertains to the combination of means for detecting the vibrations induced in the drill pipe by virtue of the drilling operation, means for discriminating between the various detected vibrations and means to sum up or collect those unique vibrations correlatable with the drill bit speed. The invention envisions the use of an electrical transducer, attached to the drill pipe or kelly, to generate voltages proportional to the vibrations induced in the drilling apparatus. These signals are amplified and then filtered to discard unwanted frequency bands. Thereafter, demodulating and additional filtering means are provided to form frequency sums and differences and to collect energy from the various vibratory pulses of like repetition rate. This will allow an identifiable signal to be obtained, the frequency of which corresponds to the rotation of the drill bit. This frequency, and hence the speed of the drill bit is determined by comparison with an oscillator of adjustable known frequency or by visual display techniques.

In one particular embodiment of the present invention, means are associated with the rotor and turbine shell to provide a positive vibrating pattern correlatable with the drill bit speed, which pattern may be detected by the surface instrumentation and converted to a speed determination. This provision guards against the improbable occurrence that the turbine and drill units will be so perfect in construction that no vibrations correlatable with turbodrill speed will be present. The use of an induced vibration pattern also allows the basic frequency and basic repetition rate to be chosen so as to distinguish it from other vibrations characteristic of the pipe rotation and mud pump pulsation.

These and other objects and features will be more fully understood when the detailed description is read in conjunction with the drawings in which.

Figure 1:
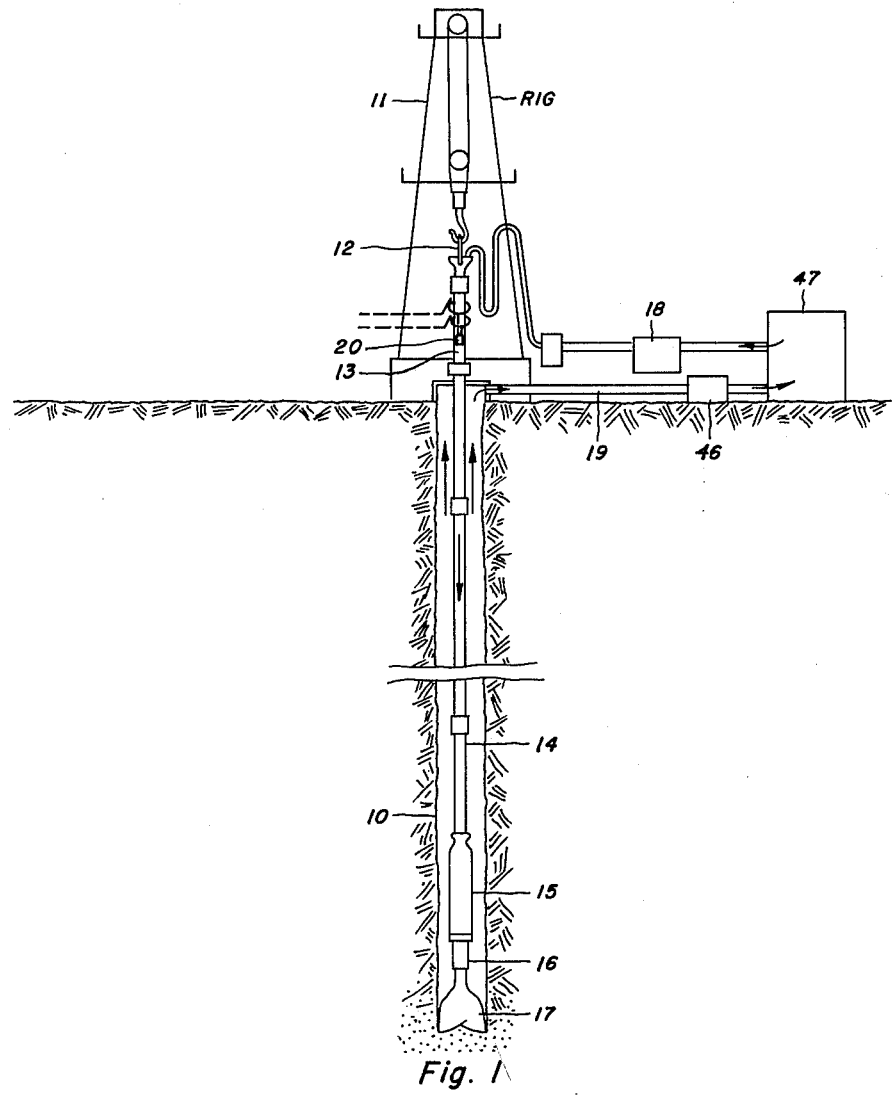
Fig. 1 is a schematic representation of an oil well rig and drill installation utilizing a turbodrill.

Looking at Figure 1 in detail, a borehole 10 is depicted with a conventional derrick 11 situated thereover. A swivel 12 supports a kelly 13 which is the top section of a plurality of sections of drill pipe 14, which extend into the borehole 10. Attached to the lowest section of drill pipe 14 is a mud driven turbine 15, the moving part of which is connected by shaft 16 to a drill bit 17. The mud impellent for the turbodrill flows through pipes and hoses 19 as illustrated by the arrows. During the course of each cycle it passes through an appropriate filter station 46, storage container 47 and mud pump 18.

Figure 2:
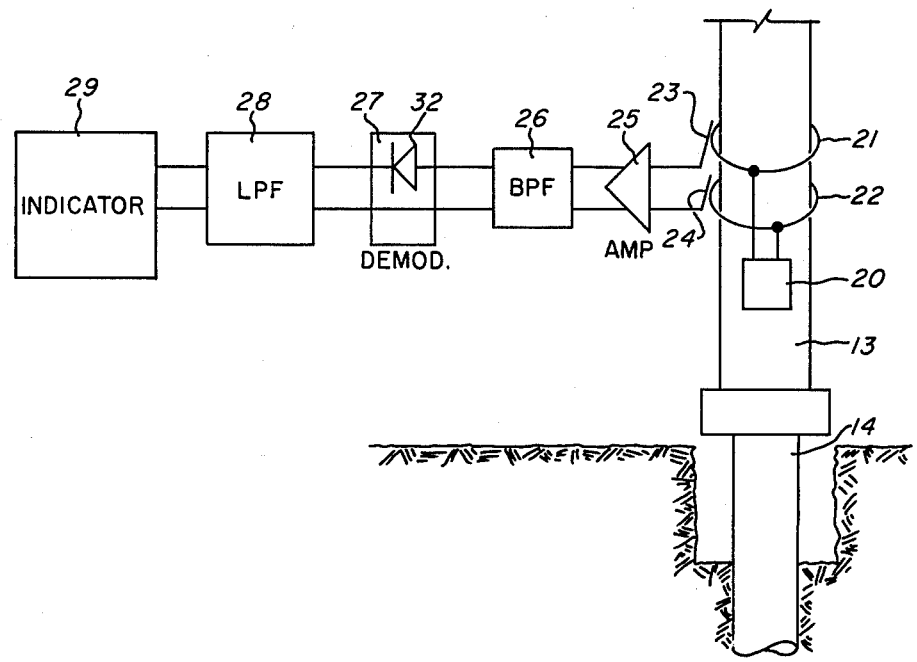
Fig. 2 is a block diagram schematic of the surface components for translating the vibrations induced in the drill pipe to a pattern correlatable with drill bit speed.

A vibration pickup or transducer 20 is supported in intimate contact with the kelly 13 (or alternatively the drill pipe) to detect any vibrations generated during drilling operations and transferred to the drill pipe. The transducer 20 may be of any conventional type, an exemplary embodiment being an electromagnetic microphone which converts induced vibrations into proportional electrical voltages. More particularly with reference to Figure 2, it may be seen that the transducer 20 is connected to a pair of slip rings 21 and 22 which are in turn engageable by brushes 23 and 24, respectively. The brushes 23 and 24 transfer signals from the transducer 20 to an indicator 29 via an amplifier 25, a band pass filter 26, a demodulator 27, and a low pass filter 28 (in the recited order).

Having noted the sequence of the surface equipment used in order to provide a determination of the turbine or drill bit speed, it is desirable to examine in more detail how these components perform their functions. As previously indicated, imperfections in the drill bit and related equipment cause certain sonic vibrations to be generated as the rotor of the turbine 15 and the drill bit 17 rotate with respect to the borehole 10. The generated vibrations will include certain oscillations which regularly recur at a rate which is correlatable with the rotation rate of the drill bit. They will also include some other regularly recurrent oscillations caused by other phenomena associated with the drilling operation but which are not correlatable with this rotation rate. Additionally, there will be random oscillations. After all of these vibration-created oscillations produced by transducer 20 have been amplified by amplifier 25 they are fed into multiple band pass filter 26 which permits only those frequencies within certain predetermined bands to be passed. These frequency bands are those in which there is found to be a favorable ratio of the energy of the regularly recurrent oscillations which are related to turbodrill speed to the energy of the oscillations which are not so related. It will, of course, be apparent that the filter 26 and the amplifier 25 can be combined or their positions reversed. That is to say, amplifier 25 could be made frequency selective thereby to provide amplification only for frequencies of interest. The output of amplifier 25 and filter 26, in any event, is a complex electrical oscillation whose components have repetition rates, among others, related to the speed of the turbine. The specific components of interest are the oscillations which vary in amplitude at a rate related to the turbine speed. The output of amplifier 25 and filter 26 is fed into a demodulator circuit 27 which employs a device having a non-linear transmission characteristic, such as diode 32. It is characteristic of such an element that it demodulates any modulated type of input and produces output signals the frequencies of which are equal to the sums and differences of the input frequencies. The output of demodulator 27 is fed through the low pass filter 28 to eliminate all values of frequency sums and differences beyond the possible rotation rates of the turbine and reasonable multiples thereof. As a practical matter, this will be most of the resultant sums so that frequency differences, primarily, will be supplied to the indicator 29.

The foundation of a system such as the present one exists because all generated frequencies, which are correlatable with the rotation rate of the drill bit, must be multiples of the basic rotation rate. For example, if it is assumed that the turbine 15 and drill bit 17 are rotating at 10 revolutions per second, all oscillations generated in a regular repeating manner due to this rotation are comprised of multiples of 10 cycles per second, though none may actually be 10 c.p.s. Perhaps a group of frequencies in the range 300 to 390 c.p.s. will be found which are caused by certain irregularities in the drill bit, whereas another group from 720 to 950 c.p.s. will be generated due to different imperfections in the turbine or drill bit construction. Yet a third series of frequencies may be generated by another and distinct group of irregularities, these perhaps being between 2300 and 2560 c.p.s. All of the frequencies in these clusters, being components of oscillations which rise and fall in amplitude during one revolution of the drill bit, have in common that they are multiples of the 10 c.p.s. rotation rate. Thus, when this conglomeration of oscillations is demodulated by the demodulator 27 the output will contain frequencies which are sums of these input frequencies as well as frequencies constituting their differences. The low pass filter 28, as noted above, will eliminate the sums of these frequencies, which range from 600 to 5000 c.p.s. or more, as above the upper limit of the normal turbodrill rotation rate (20 c.p.s.) and reasonable or relatively low multiples thereof.

It will be observed that all of the sums and differences present at the output of the demodulator 27 constitute discrete events in an arithmetic progression having a constant factor equal to the rotation rate of the turbodrill bit. In the particular example herein discussed, this factor is equal to the multiple 10 which corresponds to the assumed rotation rate of 10 c.p.s.

Lest the foregoing example create an erroneous impression, it should be remembered that all of the recurrent regular oscillations will not have components correlatable with bit speed. There may be some related to other phenomena having known revolution rates, e.g., drill pipe, mud pumps, etc.

The indicator 29, in one exemplary embodiment, may be a panoramic analyzer such as one manufactured by Panoramic Radio Products, Inc., of Mount Vernon, New York. Fundamentally, this analyzer is an oscilloscope cooperating with a variable frequency heterodyne oscillator and a sharp band pass filter. The variable frequency oscillator, which is in synchronism with the sweep generator of the scope, and the filter cooperate to separate and display the frequency components of the complex input signal.

The analyzer provides a visual display of the demodulated detected signals (from demodulator 27 and filter 28) which have regularly recurring patterns. An operator may visually eliminate those patterns attributable to the mud pump pulsation rate, the drill pipe rotation rate, etc. by varying each rate in turn and observing which "pips" change positions on the oscilloscope. By this process of elimination the frequency differences which are correlatable with turbine and bit speed may be found.

This technique for eliminating oscillations generated by parts of the drilling rig not correlated with turbine speed can be done automatically if an additional variable frequency heterodyne oscillator and filter is provided, which apparatus functions as an auxiliary wave analyzer. The auxiliary oscillator must also be controlled in synchronism with the panoramic analyzer. Inputs to this auxiliary wave analyzer would be the known rotation rates of the drill pipe, mud pump, etc., while the output thereof would be applied to the control grid of the cathode ray tube of the principal panoramic analyzer to diminish the illumination of the tube at positions corresponding to these input signals.

In some drilling operations the bit is fitted with a plurality of roller cones to crush the rock as the bit travels through a formation. In these instances, many of the groups of frequencies generated will be directly correlatable with the speed of the roller cones and not with that of the drill bit or turbine. However, there is a fixed relation between the speed of a bit and associated roller cones. In one example, the roller cones rotate 2.8 times for each rotation of the drill bit. As a result, the true rotation rate of the turbine and drill bit, insofar as frequency differences originating in the roller cones are concerned, may be found by dividing the apparent rate by 2.8. Investigation of individual bits using roller cones is necessary to determine the proper conversion factor and to determine the principal source of generated sound. If the roller cones are found to provide most of the vibrations, then they may be used to obtain the final indication of drill bit speed.

Occasionally frequency patterns are generated which are two, three or more times the actual revolution rate of the drill bit, in some ways similar to the oscillations generated by the bit cones. Though these will make it appear that a bit is rotating an integral number of times faster than it actually is, the presence of frequency differences related to the actual rotation rate will make the false ones appear merely as multiples of the basic rate or true rate. Even in the unusual case where the integral multiples are the only ones obtained, the correct rate may be ascertained by knowing the mud flow rate, which is roughly correlatable with turbine speed and may be used to determine approximate turbine speed to distinguish between two or more frequencies that might be erroneously taken to indicate turbine speed.

Figure 3:
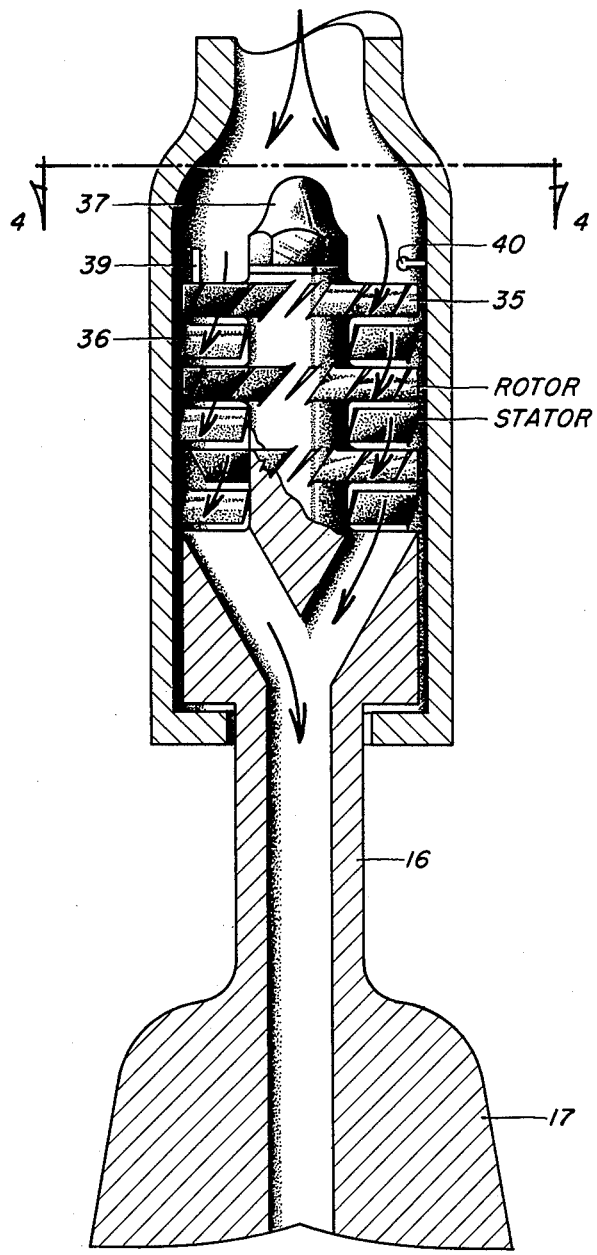
Fig. 3 is a partial cutaway of a turbine with certain parts omitted to illustrate means for generating a definite vibratory pattern.
Figure 4:
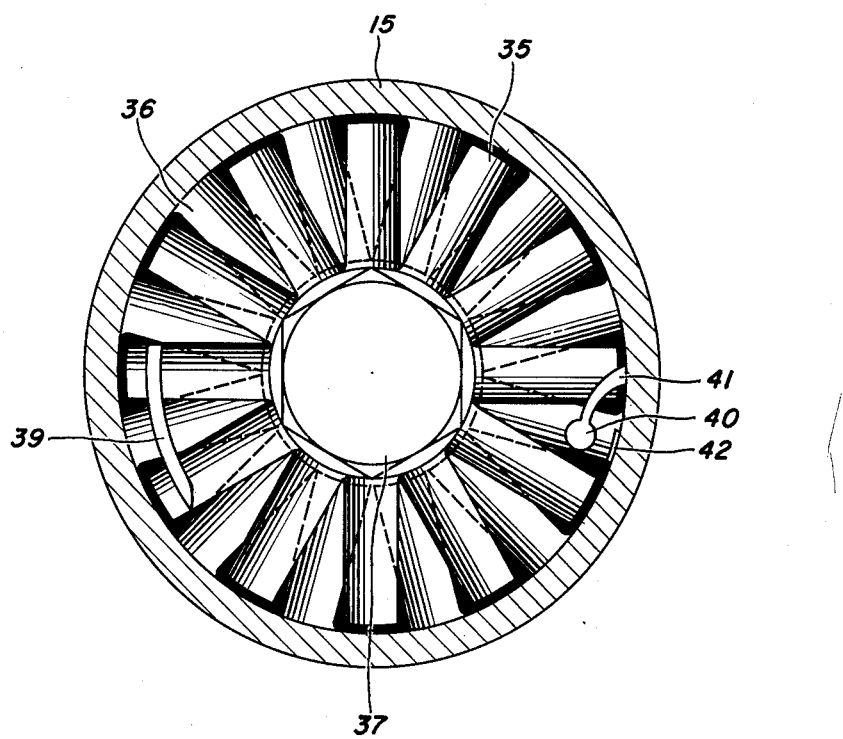
Figure 4 is a cross section of the turbine taken along line 4—4 of Fig. 3.

It may happen in rare circumstances that there will be too few imperfections in the drill bit and turbine parts to provide the regularly recurring vibration patterns that are correlatable with the drill bit speed. If this unlikely event comes to pass, a positive source of sonic vibrations may be provided. Figs. 3 and 4 illustrate, simply, how a sonic source can be combined with a rotor. Fig. 3 shows by arrows the direction of mud flow through the mud turbine 15. The rotor blades 35 are interleaved with the stator blades 36 and are integral with the shaft 37, which shaft drives the drill bit 17 by way of the intermediate shaft 16. An upright member 39 is affixed to the upper one of the rotor blades 35 and is designed to cooperate with a sounding device 40 fixedly attached by spring connector 41 to the inside of the turbine 15. As the rotor assembly and shaft 37 rotate the tapered front edge of the upstanding member 39 engages the sounding member 40 and moves it against the restoring force of connector 41. As the member 39 is rotated beyond the limit of sounder 40, the sounder 40 is released to be urged toward its unrestrained position under the force of the connector 41. This force causes sounder 40 to override its normal position and strike the anvil 42. The result is that sounding member 40 strikes the anvil 42 each time the rotor shaft 37 completes one revolution thereby generating regularly repeated oscillations directly related to the basic rotation rate of the turbine. These undulations may be detected by the transducer 20 and properly filtered, demodulated, etc., to obtain the rotation rate of the mud turbine. The need for a positive sound generating source is unlikely, but in the rare circumstances where needed the foregoing represents one form it might take. Many other sonic generators, associated with more conventional rotary drill bits, are present in the prior art. Many of these would satisfactorily provide the necessary sound source for the practice of the instant invention. The exemplary embodiment of this sounder, per se, forms no part of the instant invention.

It is to be understood, of course, that the above described arrangements are merely illustrative of the application of the principle of the invention. Numerous other arrangements may be devised by those skilled in the art without departing from the spirit and scope of this invention.

What is claimed is:

1. Apparatus for determining during drilling operations the rotating speed of a drill bit suspended in a borehole and supplied by a down-hole motor comprising, in combination, means for detecting in that portion of said supporting means near the surface of the ground vibrations induced therein by the drilling operation, means for accepting frequency components of vibrations which lie in certain predetermined bands wherein favorable ratios of energies of vibrations characteristic of drill bit rotation to vibrations unrelated to rotation exist, means for synthetizing frequencies within said bands to form at least one arithmetic progression, the difference of which frequencies identifies the rate of rotation of said drill bit, and means for eliminating synthetized frequency components having origins unrelated to the rotating speed of said drill bit.

2. Apparatus for determining during drilling operations the rotating speed of a turbine driven drill bit suspended in a borehole by a string of drill pipe comprising, in combination, means for detecting vibrations in the portion of said drill pipe near the surface of the ground which vibrations were induced therein by the drilling operation, means for accepting frequency components of vibrations which lie in certain predetermined bands wherein favorable ratios of energies of vibrations characteristic of turbine and drill bit rotation to vibrations unrelated to rotation exist, demodulating means for deriving from the frequencies within said bands their sums and differences, and means for eliminating frequency components having origins unrelated to the rotating speed of said turbine and drill bit.

3. Apparatus for determining during drilling operations the rotating speed of a turbine driven drill bit suspended in a borehole by a string of drill pipe comprising, in combination, means for detecting in the portion of said drill pipe adjacent the surface of the ground vibrations induced therein by the drilling operation, means for accepting frequency components of vibrations which lie in certain predetermined bands wherein favorable ratios of energies of vibrations characteristic of turbine and drill bit rotation to vibrations unrelated to rotation exist, demodulating means for deriving from the frequencies within said bands their sums and differences, means for eliminating sums and differences beyond the upper limit of turbine and drill bit speeds and relatively low multiples thereof, and means for eliminating regularly repeating vibratory components having origins unrelated to the speed of said turbine and drill bit.

4. Apparatus for determining during drilling operations the speed of a turbodrill bit suspended in a borehole by a string of pipe comprising, in combination, transducer means for detecting in a portion of said drill pipe situated near the surface of the ground vibrations induced therein by the operation of said bit in the borehole, means for amplifying said vibrations, first filter means for accepting frequency components of vibrations in certain predetermined bands wherein favorable ratios of energies of vibrations characteristic of turbine and drill bit rotation to vibrations unrelated to rotation exist, demodulating means including a diode for deriving from the frequencies within said bands their sums and differences, second filter means for eliminating frequency sums and differences above the upper limit of turbodrill speeds and relatively low multiples thereof, and means including a wave analyzer for displaying the individual sums and differences whereby those components unrelated to the speed of the turbodrill may be eliminated and those components correlatable with drill bit speed ascertained.

5. Apparatus for determining during drilling operations the rotation speed of a turbodrill and drill bit supported in a borehole by a string of drill pipe comprising, in combination, transducer means for detecting in a portion of said pipe disposed near the surface of the ground vibrations induced therein by the drilling operation, means for amplifying said vibrations, first filter means for rejecting frequency components of vibrations which lie in frequency bands corresponding to the fundamental and low order harmonics of the drill bit rotation rate and accepting frequency components of vibrations which lie in certain predetermined bands wherein a favorable ratio of vibrations characteristic of drill bit rotation to vibrations unrelated to rotation exist, diode means for deriving from the frequencies within said bands their sums and differences, second filter means for eliminating frequency sums and differences above the upper limit of turbodrill speeds and relatively low multiples thereof, an oscilloscope, a variable frequency heterodyne oscillator, a sharp band-pass filter, said sharp band-pass filter and said oscillator cooperating with said oscilloscope to display regularly repeating frequency patterns whereby the patterns unrelated to the speed of said turbodrill may be visually eliminated.

6. Apparatus for determining during drilling operation the rotation rate of a turbodrill and drill bit supported in a borehole by a string of drill pipe comprising, in combination, transducer means for detecting in the portion of said drill pipe disposed near the surface of the ground vibrations induced therein by said borehole operations, first filter means for rejecting frequency components of vibrations which lie in frequency bands corresponding to the fundamental and low order harmonics of the drill bit rotation rate and accepting frequency components of vibrations which lie in certain predetermined bands wherein a favorable ratio of vibrations characteristic of drill bit rotation to vibrations unrelated to rotation exist, demodulating means for deriving from the frequencies within said bands their sums and differences, second filter means for eliminating frequency sums and differences beyond the upper limit of turbodrill speeds and relatively low multiples thereof, and means to distinguish between those of the regularly repeating vibration components having origins unrelated to the speed of said turbodrill and those related thereto, said means including a first wave analyzer for displaying regularly repeating frequency patterns and a second wave analyzer synchronous with said first analyzer.

References Cited in the file of this patent

UNITED STATES PATENTS

| | | |
|---|---|---|
| 2,352,219 | Olesen | June 27, 1944 |
| 2,539,618 | Good et al. | Jan. 30, 1951 |